UNITED STATES PATENT OFFICE.

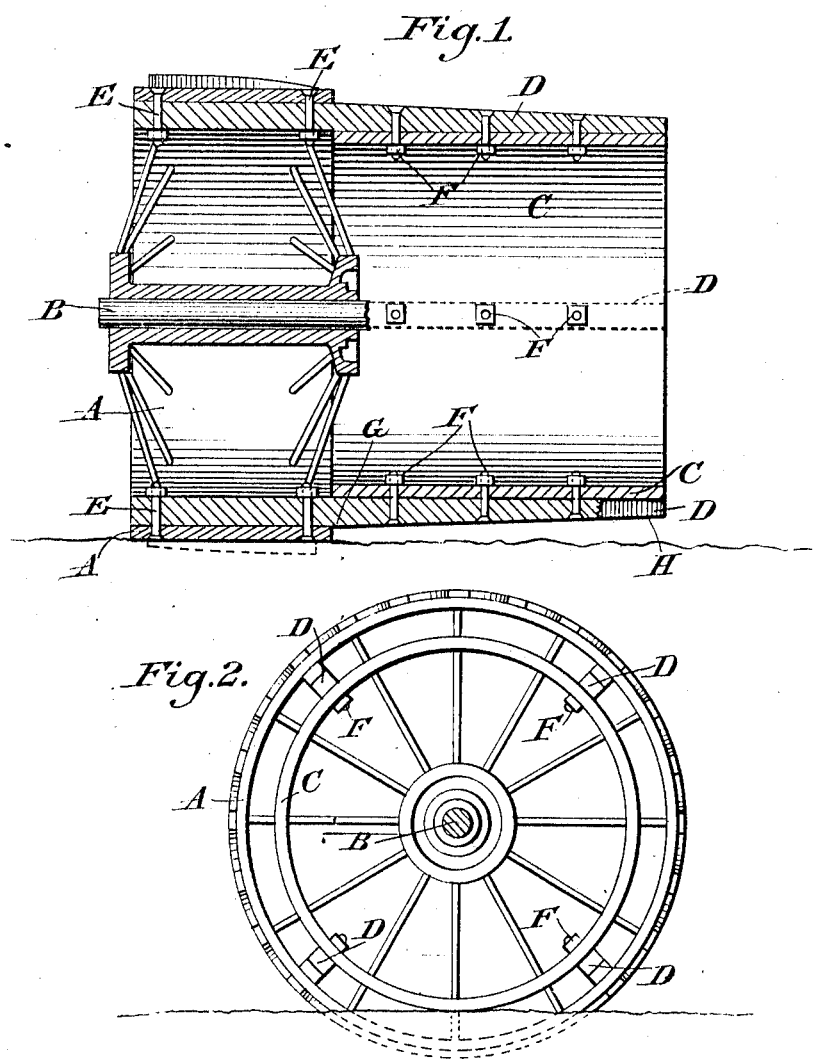

THORGER SCHEIE, OF SPY HILL, SASKATCHEWAN, CANADA.

EXTENSION-RIM FOR TRACTION-ENGINE WHEELS.

954,214.  Specification of Letters Patent.  Patented Apr. 5, 1910.

Application filed June 23, 1909. Serial No. 503,974.

*To all whom it may concern:*

Be it known that I, THORGER SCHEIE, a subject of the King of Great Britain, residing at the village of Spy Hill, in the Province of Saskatchewan, Canada, have made certain new and useful Improvements in Extension-Rims for Traction-Engine Wheels, of which the following is a description in such full, clear, and exact terms as to enable those skilled in the art to make and use the same.

My invention relates to improvements in extension rims for traction engine wheels, and the principal object of my invention is to provide a traction-engine wheel with an extension-rim so constructed as to give the traction-wheel better purchase in soft or boggy ground than is now commonly had so that the engine will be shoved ahead until firm ground is met when the same can, under its own power, lift itself onto the firm ground.

Another object of my invention is to construct my extension-rim so that the means co-acting therewith whereby the traction-wheel lifts itself onto the firm ground under its own power, is held out of contact with the ordinary roadway so as to prevent the unnecessary cutting up of the same and the undue jarring of the engine; and the construction of my invention will be hereinafter particularly described; and the parts I claim as new will be pointed out in the claims forming part of this specification.

Figure 1 is a longitudinal central section through a traction-wheel showing the same provided with my extension-rim, and Fig. 2 is an end elevation of my extension rim shown in Fig. 1.

In the drawings, like characters of reference indicate corresponding parts in each figure.

It is a common occurrence for the wheels of traction-engines, particularly the traction-wheels, to sink into soft or boggy places in the roadbed, and cause great trouble before they can be got onto firm ground. Now I have designed my invention so that the traction-wheels will have a better purchase on the soft ground in which they may be sunk so that they will, when rotated, shove the engine ahead until firm ground is met, so that the engine, under its own power, will lift itself onto the firm ground. The means I employ for attaching the extension rim to the traction-wheel will be as few as possible consistent with the proper carrying out of their function. In extension rims now on the market, bars or cleats are plentifully provided, which, under the rotary action of the wheel, churn up the soft or boggy ground, thus oftentimes so softening the ground as to cause the traction-wheel to sink deeper thereinto. Now I reduce to the lowest number the bars or wings which co-act with the extension-rim as I find that wherever very few of the same are used the soft ground is not cut or chopped up, and therefore when one of my bars or wings presses against a section of this boggy or soft ground under the rotary action of the traction-wheel, and considering that the smooth periphery of the extension-rim in contact with the soft or boggy ground, is packing the same under the weight of the engine, a more solid section of the ground is provided whereby the wing or bar, pressing against the same, has a better purchase than would be the case were the surface of the extension-rim plentifully provided with wings, bars, or cleats, as will be understood.

A is any suitable make of traction-wheel, and B the shaft therefor.

C is the extension-rim which may be of any desired construction, and this extension-rim is essentially circular and of a smaller diameter than the traction-wheel to which it is secured. Suitably secured to the outside of the extension-rim C are a plurality of wings or bars D which extend within the traction-wheel A, and are removably secured to the rim thereof by the nuts and bolts E or equivalent fastening means.

F are nuts and bolts by means of which the wings or bars D are detachably secured to the extension rim C.

Fig. 1 represents a traction-wheel passing over a hard roadbed, and as the wings or bars D are tapered on their outer edges from the point G to the point H, that is to say, for the distance they project beyond the traction-wheel A, it will be understood that these wings or bars, and extension-rim C, will be held clear of the roadbed. When a traction-engine is passing over a hard roadbed, not only do the ordinary calks or bars thereof cut up the roadway, but the presence of the same on the traction-wheel causes a considerable jar on the engine. Now by constructing my wings or bars as described, it will be clearly understood that I prevent any undue cutting up of the roadbed, and also prevent any unnecessary jarring on the engine which would naturally result were the wings or bars D brought into contact with the roadbed.

As before set forth, the wings or bars D are as few in number as possible, and are preferably positioned so that there will be sufficient space between them to permit the extension rim C to settle onto the soft ground. Now as this extension rim is free of any cleats, bars, or wings, between the wings or bars D, it will be understood that the same will not cut into the boggy ground and thus more or less render it softer. But, on the contrary, because of the smooth surface of the extension-rim C between the wings or bars D, the boggy ground the same is in contact with, will be pressed under the weight of the traction-engine, and thus provide a comparatively firm section of the boggy ground against which the wings or bars D will press under the rotary action of the traction-wheel. From the foregoing it will be understood that my extension rim and the wings or bars D co-acting therewith will produce much better results than can be produced where a large number of cleats, bars, or wings are used in connection with the extension rim. During the continued revolution of the traction-wheel, the engine is advanced, and when firm ground is met, the wings or bars D will enable the traction engine, under its own power, to lift itself out of the boggy land onto this firm ground.

By one skilled in this art, it will be understood that by having as few of the bars or wings as possible, when the traction-wheel comes to the edge of the hard or firm ground, my extension-rim will not eat into the same, as is the case where the ordinary extension rim is used which is provided with a large number of wings or bars. These wings or bars on the ordinary extension rim really act as teeth, and under the rotary action of the traction-wheel, the firm ground is torn away more than is necessary. Now by having as few of the wings or bars D as possible, it may often result that the first bar or wing to come into contact with the firm ground will contact therewith a considerable distance beyond the outer edge of the firm ground, and therefore it is very apparent that under such conditions a much better purchase is had on the firm ground than is the case where a plurality of the bars or wings are tearing away at the edge of the same.

After the traction-wheel has been lifted onto the firm ground, the function of the extension-rim and the wings or bars D has been performed, and they are only brought into play again when the engine runs into soft ground.

While I have described what I consider to be the best embodiment of my invention, I desire it to be understood that the principles can be embodied in different forms, and I desire not to be limited beyond the requirements of the prior art, and the terms of my claims.

What I claim as my invention is:

1. The combination with a traction-wheel, of an extension-rim of lesser diameter than said traction-wheel, and a plurality of wings or bars spaced well apart, detachably secured to said traction-wheel and to the outside of said extension rim, and having their outer edges positioned within the outer circumference of said traction-wheel.

2. The combination with a traction-wheel, of an extension-rim of lesser diameter than said traction-wheel; a plurality of wings or bars spaced well apart, detachably secured to said traction-wheel and to the outside of said extension-rim, and having their outer edges beveled to their outer ends commencing from where they project beyond the side of said traction-wheel, thereby insuring the said wings or bars a position within the outer circumference of said traction-wheel, and means for detachably securing said wings or bars to said traction-wheel and to said extension-rim.

Signed at Langenburg this nineteenth (19) day of May 1909.

THORGER SCHEIE.

Witnesses:
 ADOLF BECKER,
 JOE. JIRA.